United States Patent [19]

Alley et al.

[11] Patent Number: 5,710,922
[45] Date of Patent: Jan. 20, 1998

[54] METHOD FOR SYNCHRONIZING AND ARCHIVING INFORMATION BETWEEN COMPUTER SYSTEMS

[75] Inventors: Peter E. Alley, Saratoga; Walter R. Smith, Palo Alto, both of Calif.

[73] Assignee: Apple Computer, Inc., Cupertino, Calif.

[21] Appl. No.: 575,013

[22] Filed: Dec. 18, 1995

Related U.S. Application Data

[63] Continuation of Ser. No. 72,606, Jun. 2, 1993, abandoned.

[51] Int. Cl.$^6$ .................................................. G06F 17/30
[52] U.S. Cl. .................... 395/617; 395/618; 395/619; 395/182.18
[58] Field of Search .......................... 395/618, 619, 395/617, 182.18, 235, 239, 242, 243, 200.03, 608

[56] References Cited

U.S. PATENT DOCUMENTS

| | | | |
|---|---|---|---|
| 5,170,480 | 12/1992 | Mohan et al. | 395/600 |
| 5,261,094 | 11/1993 | Everson et al. | 395/600 |
| 5,293,627 | 3/1994 | Kato et al. | 395/558 |
| 5,333,265 | 7/1994 | Orimo et al. | 395/200 |
| 5,333,316 | 7/1994 | Champagne et al. | 395/600 |
| 5,375,234 | 12/1994 | Davidson et al. | 395/600 |
| 5,511,188 | 4/1996 | Pascucci et al. | 395/619 |

*Primary Examiner*—Thomas G. Black
*Assistant Examiner*—Hosain T. Alam
*Attorney, Agent, or Firm*—Hickman Beyer & Weaver, LLP

[57] ABSTRACT

A method for synchronizing the data between two separate computer systems is described. In a first aspect of the invention, the method includes the step of identifying each record stored in the memory of the first computer system that is intended to be synchronized. The records are identified with a unique identification indicia and an indicia that indicates the last time that the record was altered. Using the time of the last synchronization information, each of the selected records that was added to or deleted from one of the computer systems since the last synchronization is identified and added to or deleted from the other computer system. Further, each of the records that was modified on one computer system is modified on the other. If conflicting actions have occurred on the two computer systems, then the conflicts are handled in accordance with a predetermined protocol. In a preferred aspect, a synchronization list is created that identifies each of these additions, deletions and modifications and either prioritizes them in accordance with the protocol or informs the user of the conflicts.

20 Claims, 13 Drawing Sheets

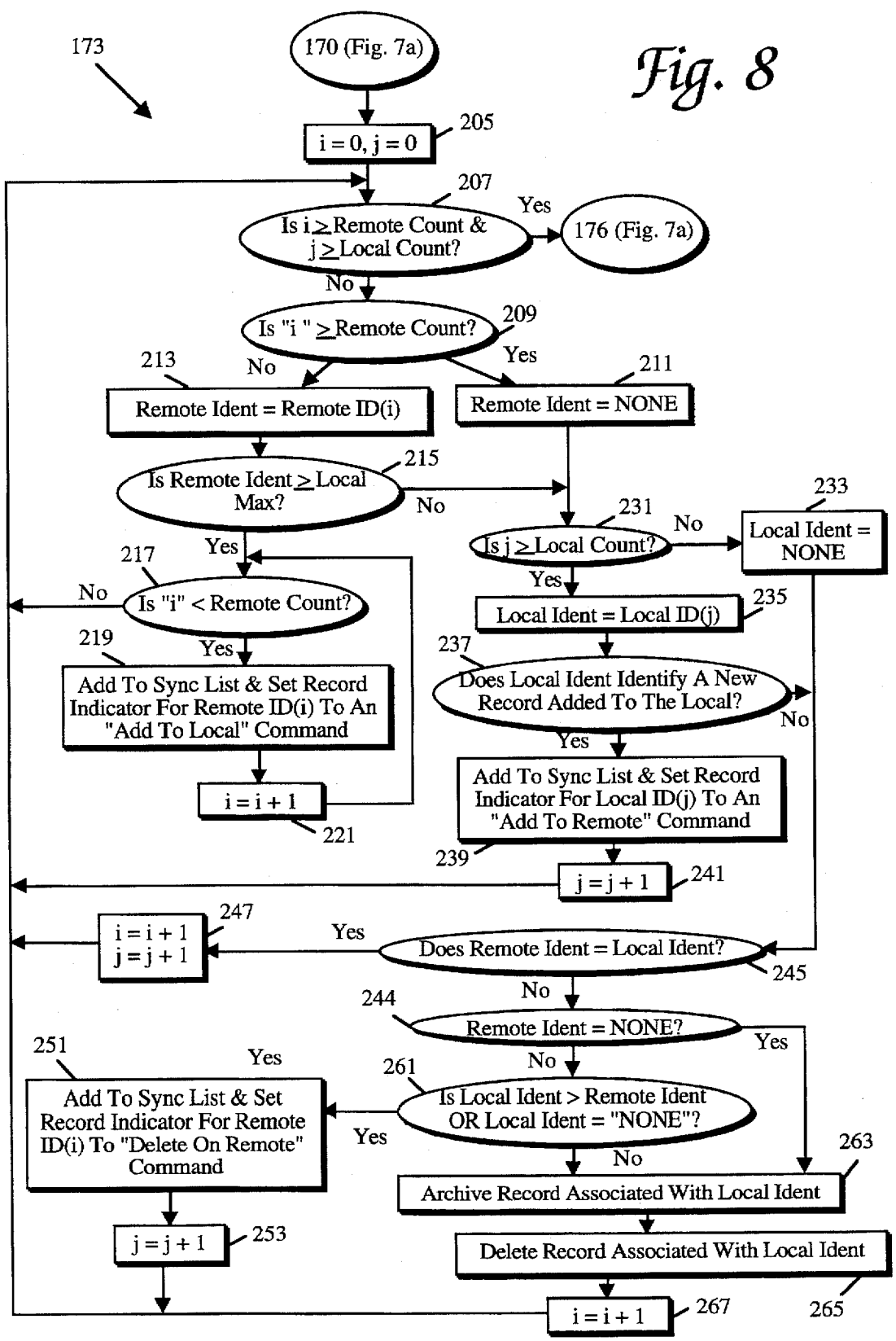

ns. Typically, one of the computer systems is portable, such as a pen-based computer system, while the other computer system is a desk-top personal computer system.

METHOD FOR SYNCHRONIZING AND ARCHIVING INFORMATION BETWEEN COMPUTER SYSTEMS

This is a continuation of application Ser. No. 08/072,606 filed Jun. 2, 1993, now abandoned.

BACKGROUND OF THE INVENTION

The present invention relates generally to a method of synchronizing information stored in separate computer systems.

The use and popularity of portable pointer and pen-based computer systems, including pen-based, stylus-based, track ball, and mouse driven systems has been increasing dramatically in recent years. This increased popularity is typically attributed to the ease of use of such machines, when compared to traditional computing systems that utilize only a keyboard as an input device.

A pen-based computer system is a small, often hand held, computer system in which the primary method for inputting data includes a stylus or "pen." A typical pen-based computer system is housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of the stylus on the viewing screen and provides positional information to the computer's central processing unit (CPU). Some display assemblies can also sense the pressure of the stylus on the screen to provide further information to the CPU. When operating as an output device, the display assembly presents computer-generated images on the screen.

The dual-function display assembly of a pen-based computer system permits users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen. With suitable recognition software, text and numeric information can also be entered into the pen-based computer system in a similar fashion.

Besides serving as a notepad, portable pen-based computers can provide a number of useful functions, such as serving as an address book, an appointment calendar, a to-do list, etc. These functions can be tightly integrated with the operating system of the computer, permitting information input into one function to impact upon another function.

One desirable use of a portable hand-held computer is to use it while away from the office or workspace but then being able to use the information stored thereon in a separate computer system located at the home office. Therefore, it is desirable to provide a mechanism for synchronizing the data between a remote computer (such as a portable computer) and a host computer (such as a conventional desktop style personal computer). It is also desirable to provide a mechanism for backing up the data saved on portable computers to protect against the risks of a memory crash.

SUMMARY OF THE INVENTION

The present invention to provides an improved method for synchronizing the data between two separate computer systems. Typically, one of the computer systems is portable, such as a pen-based computer system, while the other computer system is a desk-top personal computer system.

In a first aspect of the invention, the method includes the step of identifying each record stored in the memory of a first computer system that is intended to be synchronized. The records are identified with a unique identification indicia and an indicia that indicates the last time that the record was altered. To begin synchronization, communication between the first computer system and the second computer system is initiated, and the last time that the records of the first computer system were synchronized with the second computer system is identified. Using the time of the last synchronization information, each of the selected records that was deleted on the first computer system since the last synchronization is identified and for each such deleted record on the first computer system, the corresponding record from the second computer system is deleted. Additionally, each of the selected records that was added to the first computer system since the last synchronization are identified and copied to the second computer system to create a corresponding record in the second computer system. Further, each of the selected records in the first computer system that has both a corresponding record in the second computer system and which was modified on the first computer system since the last synchronization is identified and synchronized.

In a preferred embodiment, each of the selected records that was added to the second computer system since the last synchronization is identified and added to the first computer system. The records added to the second computer system are given special identifying indicia when they are created. Then when they are added to the first computer system, they are given a permanent unique identifying indicia that is chosen in accordance with the identifying protocol of the first computer system. In another separate preferred aspect, records that are deleted from the second computer system during the synchronization process are archived.

In another preferred embodiment, a check is made for each modified record in either of the computer systems to determine whether an associated corresponding record in the other computer system has also been modified. When the record has only been modified in one of the computer systems, the associated record is replaced by a copy of the modified record. When a conflict occurs wherein the record has been modified in each system, the user is informed of the conflict.

In another preferred aspect of the invention, the second system is capable of synchronizing with a plurality of different first computer systems that may each have different data. At the same time, the first computer system is capable of synchronizing its records with a plurality of different second computer systems.

In a separate method aspect of the invention, a synchronization list is created that identifies: 1) each of the selected records that was deleted on the first computer system since the last synchronization but still exists on the second computer system; 2) each of the selected records that was deleted on the second computer system since the last synchronization but still exists on the first computer system; 3) each of the selected records that was added to the first computer system; and 4) each of the selected records that was added to the second computer system. The synchronization list is then modified in accordance with a predetermined protocol and the modified list is used to synchronize the first and second computer systems. Generally, records that have been deleted on one of the computer systems are deleted from the other and records that have been added to one of the computer systems are generally added to the other.

In a preferred aspect, the synchronization modification step includes the substeps of adding entries corresponding to the selected records that have been modified on the first computer system to the synchronization list and adding entries corresponding to selected records that have been modified on the second computer system to the synchronization list. Preferably, the synchronization list contains at most one entry for each record. Therefore, a protocol is made to handle conflicts. In one preferred protocol, when a record has been modified in one of the computer systems and its corresponding record has been deleted in the other, the modified record will be deleted. When a record has been modified in both computer systems, the user will be informed of the conflict. In an alternative protocol, when a record has been modified in one of the computer systems and its corresponding record has been deleted in the other, the user will be informed of the conflict.

BRIEF DESCRIPTION OF THE DRAWINGS

FIG. 8 is a flow diagram illustrating the method of generating an initial sync list as set forth in FIG. 7(a) in more detail.

DETAILED DESCRIPTION OF THE PREFERRED EMBODIMENTS

The present invention is particularly well suited for synchronizing a portable computer system with another computer system such as a desktop or larger computer system. In one specific application, the invention is used in conjunction with a pointer-based portable computer system such as the pen-based, stylus-based and mouse-based systems that are currently popular. For the purposes of illustration, the invention will be described in connection with a portable pen-based system that is synchronized with a desktop computer. Thus, by synchronizing the portable with the desktop, a user can use the portable in the field and the desktop in the base office. The desktop can also be used as a backup for the portable in the event of a memory crash.

Figure 1:
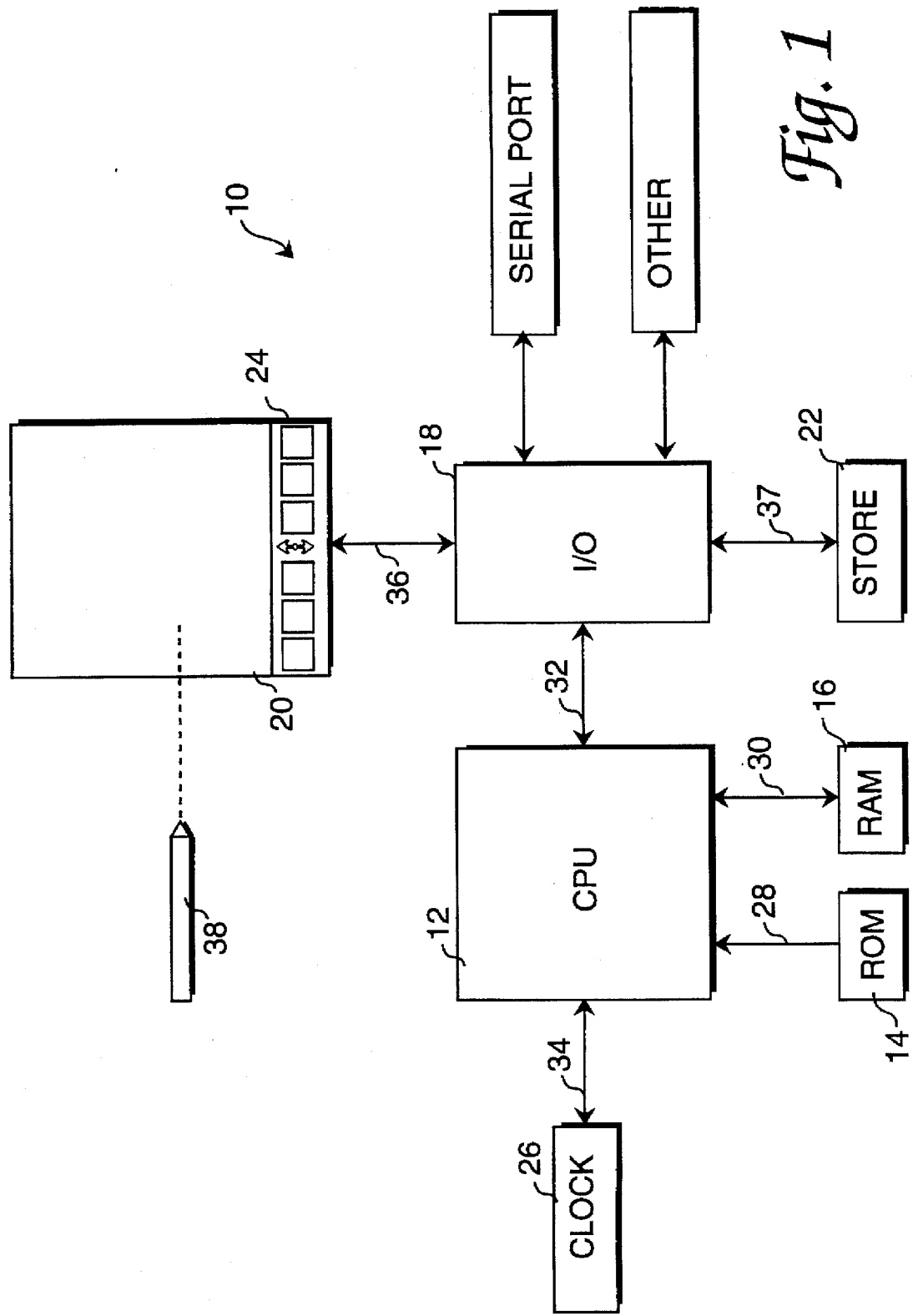
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24 arranged as an array of input buttons, a serial port, another I/O port and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, the keypad 24, a serial port and an I/O port. Keypad 24, the serial port, and the I/O port are each coupled to the I/O circuitry 18 by a suitable data bus.

Clock 26 provides a series of clock pulses and is typically coupled to an interrupt port of CPU 12 by the data line 34. The clock pulses are used to time various functions and events relating to the computer system 10. The clock 26 can be eliminated and the clock function replaced by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position-sensitive membranes are also readily available on the commercial market. Combination display assemblies (such as display assembly 20) which include both the LCD and the input membrane are commercially available from such vendors as Scriptel Corporation of Columbus, Ohio.

The keypad 24 can comprise an array of switches. In the present embodiment, the keypad 24 comprises "button" areas which overlie the bottom edge of the membrane which covers the LCD display. When the "buttons" are depressed, the membrane senses the pressure and communicates that fact to the CPU 12 via I/O circuitry 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that case, the RAM 16 could be provided with a backup battery to prevent the loss of data even when the pen-based computer system 10 is mined off. However, it is generally desirable to have some type of long term storage 22 such as a commercially available miniature hard disk drive, or nonvolatile memory such as flash memory or battery backed RAM, PC-data cards or the like. Storage 22 is coupled to I/O 18 by a bi-directional data bus 37.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e., X & Y) coordinates of a pixel of the screen of display assembly 20 over which the tip of the stylus is positioned. Commercially available combination display assemblies (such as the aforementioned assemblies available from Scriptel Corporation) include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
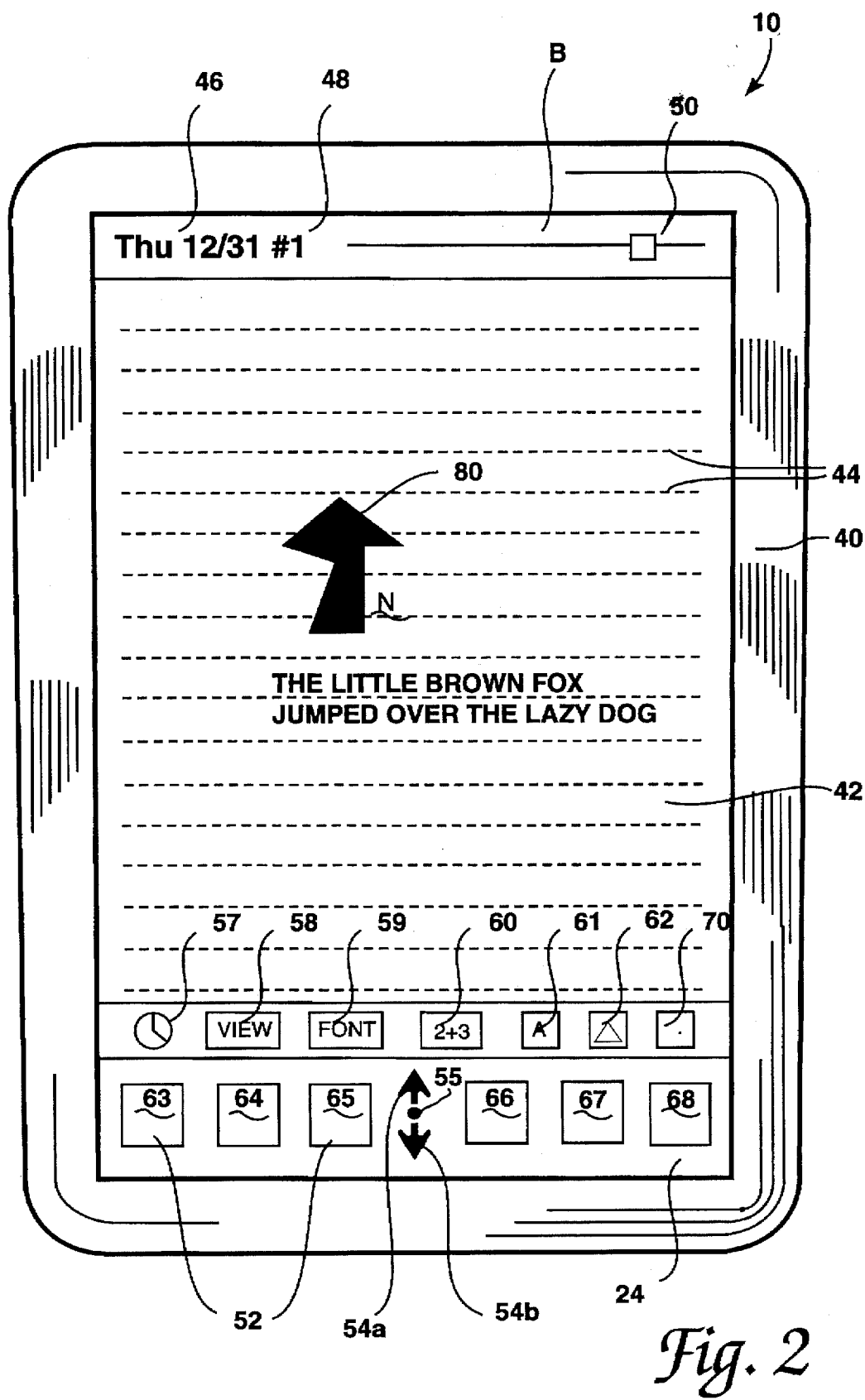
FIG. 2 is a top plan view of the screen, case and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein the term "screen" will refer to the portion of the display assembly 20 which can display an image that can be viewed by a user. Also accessible to the user is the keypad 24.

Upon power-up, pen-based computer system 10 displays on screen 42 an initial note area N including a breaker bar B and a number of guidelines 44. The breaker bar B preferably includes the date of creation 46 of the note N, a note number 48 and a "router" button 50 which allows notes to be dispatched to a printer, facsimile, the trash, etc. The optional guidelines 44 aid a user in entering text, graphics, and data into the pen-based computer system 10.

In this preferred embodiment, the keypad 24 is not a part of the screen 42 but, rather, is a permanent array of input buttons coupled to the CPU 12 by I/O circuitry 18. Alternatively, the keypad 24 could comprise "soft buttons" generated at a convenient location on the screen 42, in which case a "button" would be activated by touching the stylus to the screen over the image of the button. The keypad 24 preferably includes a number of dedicated function buttons 52, a pair of scroll buttons 54A, 54B and an overview button 55. The operation of the scroll buttons 54A and 54B, and other aspects of computer system 10 are discussed in greater detail in co-pending U.S. patent application Ser. No. 07/868, 013, filed Apr. 13, 1992 on behalf of Tchao et al. entitled "Method for Manipulating Notes on a Computer Display." That application is assigned to the assignee of the present application and its disclosure is hereby incorporated by reference in its entirety. The function buttons 52 include an address button 63, a calendar button 64, a drawer button 65, a find button 66, an undo button 67, and an assist button 68.

The screen illustrated in FIG. 2 is referred to as the "notepad", and is an application program running under the operating system of the pen-based computer system 10. In this preferred embodiment, the notepad is a special or "base" application which is always available beneath higher level applications. The notepad application, like other applications, runs within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 57, a view button 58, a font button 59, a formulas button 60, a text button 61, a graphics button 62, and a nib button 70. Copending application Ser. No. 07/976,970, filed Nov. 16, 1992, on behalf of Foster et al., entitled, "Status Bar for Application Windows", and assigned to the assignee of the present invention describes the operation of the status bar, and is hereby incorporated herein by reference in its entirety.

As described in the above-referenced application by Tchao et al., in one suitable embodiment of the present invention, a notepad application program is launched when the computer system 10 is turned on. The address button 63 can then be used to launch an address book application program. That is, when the address button 63 is depressed, a suitable address book application program is opened and a suitable address book dialog box is displayed on screen 42. Similarly, the calendar button 64 launches a calendar application program when depressed.

The "Find" button 66 is used to initiate a search for information. The undo button 67 will undo the latest user action when depressed and will undo the last two actions if depressed a second time without the intervention of any additional user actions. The assist button 68 gives the user access to a help menu which is designed to provide operating instructions to the user that may be helpful when the user is unsure of how to operate the computing system.

A "drawer", which is opened by pressing the drawer button 65 is used to store other application programs, tools, access buttons to external ROM cards, communications applications and other items that can be utilized by the user. When the drawer is "opened", a drawer dialog box is displayed on the screen 42. When the dialog box is opened, the user can then launch any application stored therein merely by tapping on the associated icon that is displayed within the drawer dialog box. Thus, the icons serve as "soft buttons" which may be activated by tapping the screen at a location corresponding to the displayed position of the icon. Of course, in alternative embodiments, the applications that are accessed by keypad buttons can be varied widely. For example, additional keys could be added, existing keys removed, and/or the above described keys could be used to launch different applications.

A plurality of application programs (sometimes referred to as packages) may be stored in the portable's memory. By way of example, the notepad, a calendar application, an address book type application, a to-do list application and a variety of other application programs may be provided. The memory may be divided into two or more discrete sections (sometimes referred to as stores herein), which represent separately addressable segments of memory. By way of example, internal RAM that acts as a first portion of memory may be considered one store. A PCMIA card, which can be a part of mass storage 22, may be considered a second store. Within each store, much of the data may be divided into a plurality of different record files (sometimes called soups herein). The record files each include a number of records that are to be used with one or more of the specific application files. In one suitable embodiment, each page (screen-full) of text constitutes a separate record, with each record being given a record number that is unique within that application file. Thus, for example, within the calendar application file, there may initially be thirty records. These records would be given record numbers zero to twenty-nine, respectively.

If a particular record is deleted, no attempt is made to reuse that number. Rather, the record is treated as though it has no information in it. When new records are added, they are simply given the next higher record number. Thus, in the above example, the next record that is added (the thirty-first record) would be given the record number thirty. In the described example, this would be true regardless of whether (for example) records numbers six and twelve had been deleted. The total number of records within a particular record file is stored in memory. For the purposes of this application, the stored value representative of the highest record number within a record file (i) on the remote computer system will be labeled "REMOTE MAX." At the same time, the stored value representative of the highest record number within a record file (i) on the local computer system will be labeled "LOCAL MAX."

Each record file is also given a unique application file number. Thus, by way of example, the record file associated with the notepad application program may be assigned the value "zero", the record file associated the calendar application program may be assigned the value "one", the address application program's record file "two" and so forth. Each record in each record file includes identification indicia which indicates the record number and the time and date that the record was last edited.

In many situations, it will be desirable to backup the information on the hand-held computer system. In order to accomplish that, a conventional computer such as a conventional personal computer, a conventional minicomputer or any other type of computer can be used as the "docking" computer which back up the information stored on the "remote" hand-held device. It is also desirable to provide a mechanism for synchronizing the data between the hand-held computer system and the "docking" computer. By way of example, a suitable computer for the dock is a commercially available Macintosh computer manufactured by Apple Computer, Inc.

Figure 3:
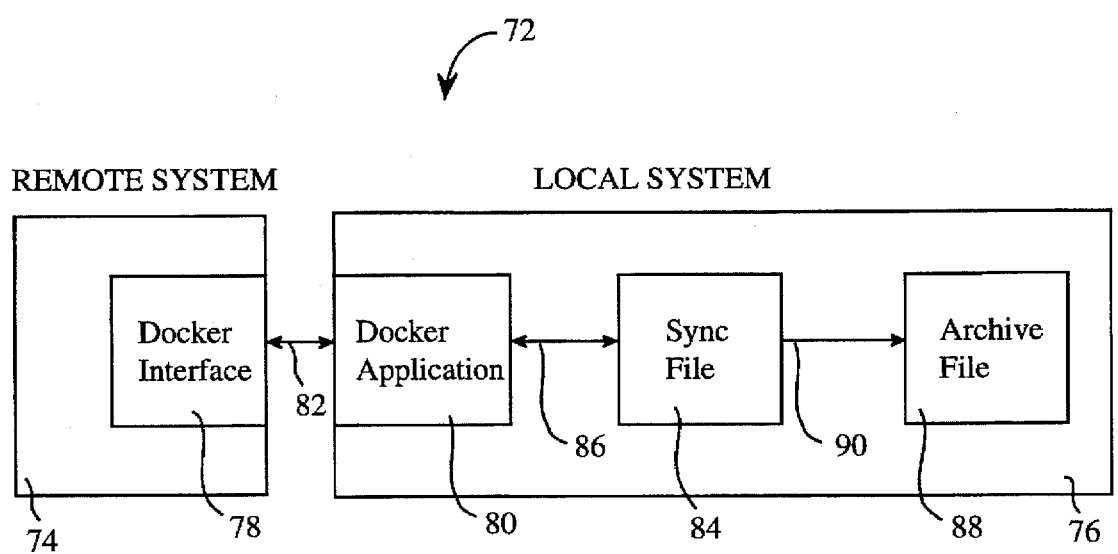
FIG. 3 is a block diagram illustrating the relationship between a remote computer system and the applicable synchronization and archive fries of a local computer system.

In FIG. 3, a remote/local docking system 72 in accordance with the present invention is illustrated in block diagram form with the data transfer routes shown in arrows. The system 72 includes a remote system 74 (such as the aforementioned pen-based computer 10) and a local system 76 (such as a Macintosh computer system). The remote system 74 includes a docker interface 78, which is a relatively compact piece of code running on system 74 which allows the remote system to communicate with a larger docker application 80 running on the local system 76. The docker interface 78 is conveniently stored within the "drawer" of the system 10 described previously, and is activated by opening the drawer with the drawer button 65 and "clicking" on its icon with stylus 38. As can be seen in FIG. 3, the communication between docker interface 78 and docker application 80 is preferably bidirectional, as indicated by arrow 82. The docker application communicates bi-directionally with a synchronization or "sync" file 84 as indicated by arrow 86. The docker application also communicates with an archieve file 88 so that data may be sent from the synchronization file 84 to the archive file 88 as indicated by a unidirectional arrow 90.

Referring next to FIGS. 4–12, a process is illustrated which is suitable for synchronizing data records in two separate computer systems. Although the process may be carried out on any two computer systems, the description will be in terms of a portable computer system referred to as the "remote" and a desktop computer system referred to as the "local."

Figure 4:
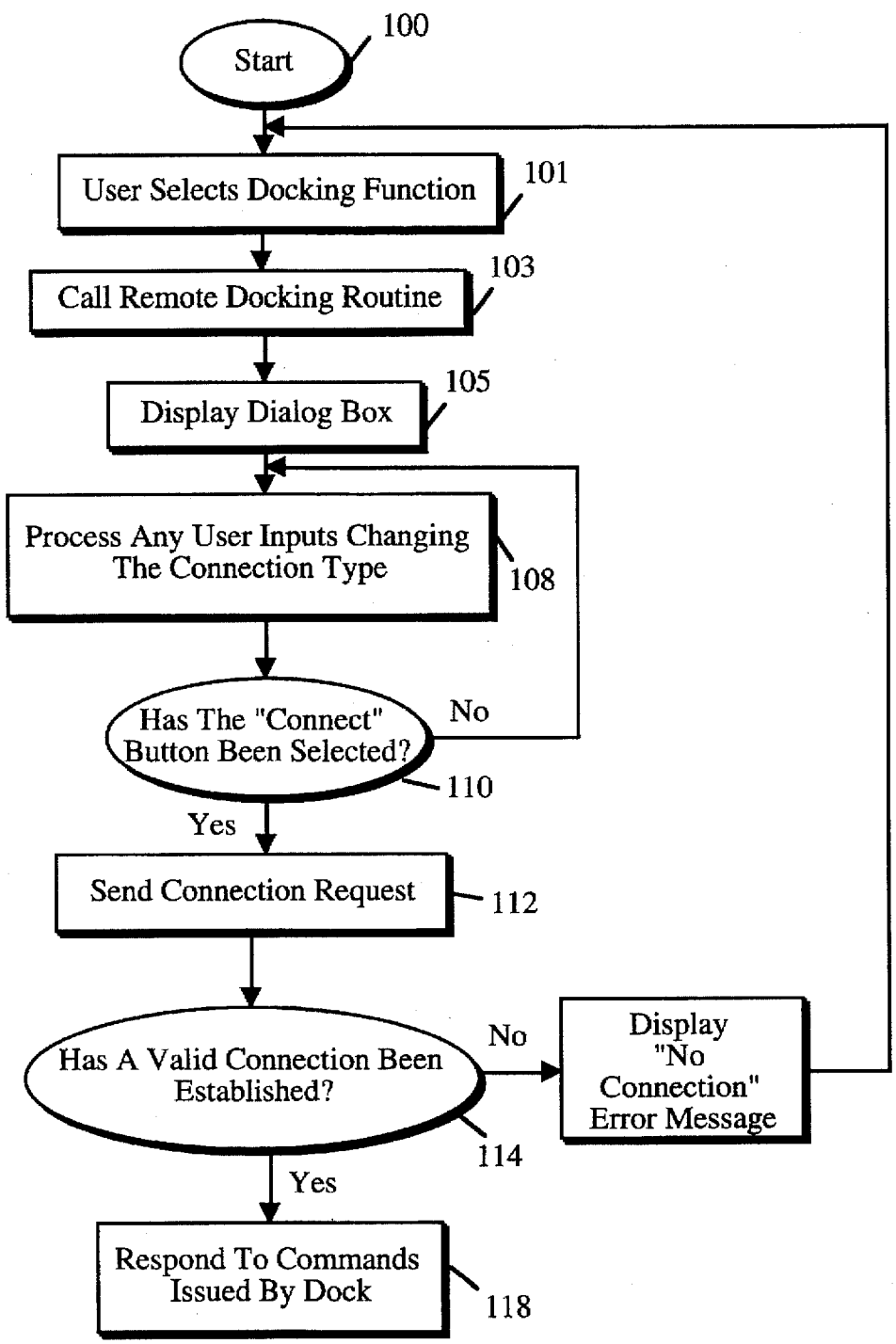
FIG. 4 is a flow diagram illustrating a method suitable for initiating the docking function from the remote side.

Referring initially to FIG. 4, a process suitable for initiating the docking function from the remote side will be described. The process begins in step 101 when the user selects the docking function. This may be done in any conventional way, such as selecting an icon located in a drawer or window, selecting a command from a pull-down menu, or entering a command in any other suitable manner. When the docking function is selected, a remote docking routine stored in the ROM 14 is called in step 103 and executed as described below.

The docking routine begins in step 105 by displaying a dialog box 500 on the screen 42 of the remote. The dialog box asks the user about the type of connection they would like to make. In the embodiment shown the dialog box (not shown) permits the user to select the type of unit to be used as the dock (which is frequently referred to as the local computer herein). By way of example, as shown, the dock may be any type of desktop style personal computer, a workstation, a minicomputer, a portable computer or most any other type of computing system that has sufficient power and memory to backup the data on the remote computer. By way of example, in the described embodiment, the dock can take the form of a Macintosh computer manufactured by Apple Computer, Inc. or an IBM-PC compatible system made by a variety of manufacturers. After the dialog box 500 has been displayed, the user selects the type of docking connection in step 108. In a preferred embodiment, a default connection is initially displayed. By way of example, a suitable default may be the last selected connection type. When the default is suitable, then the user does not need to actively select a connection type. Once the desired connection has been selected, the user selects the connect button in step 110. When the connect button is selected, a connection request is sent from the remote to the dock to establish a connection (step 112). Thereafter, in step 114, a determination is made as to whether a connection has been established.

If a connection is established, control is turned over to the dock which will periodically send requests or commands to the remote. The remote then simply responds to the requests which is designated by step 118. If no connection is established within a predetermined period of time, then in step 116 the logic displays an error message to the effect that no connection has been established and the docking process is terminated. In order to reestablish the connection, the entire process may be repeated. Of course, in alternative embodiments, the actual steps undertaken to establish a connection may be varied widely and upon the failure to establish a connection, the logic could be returned to any intermediate point in the connection sequence.

Figure 5:
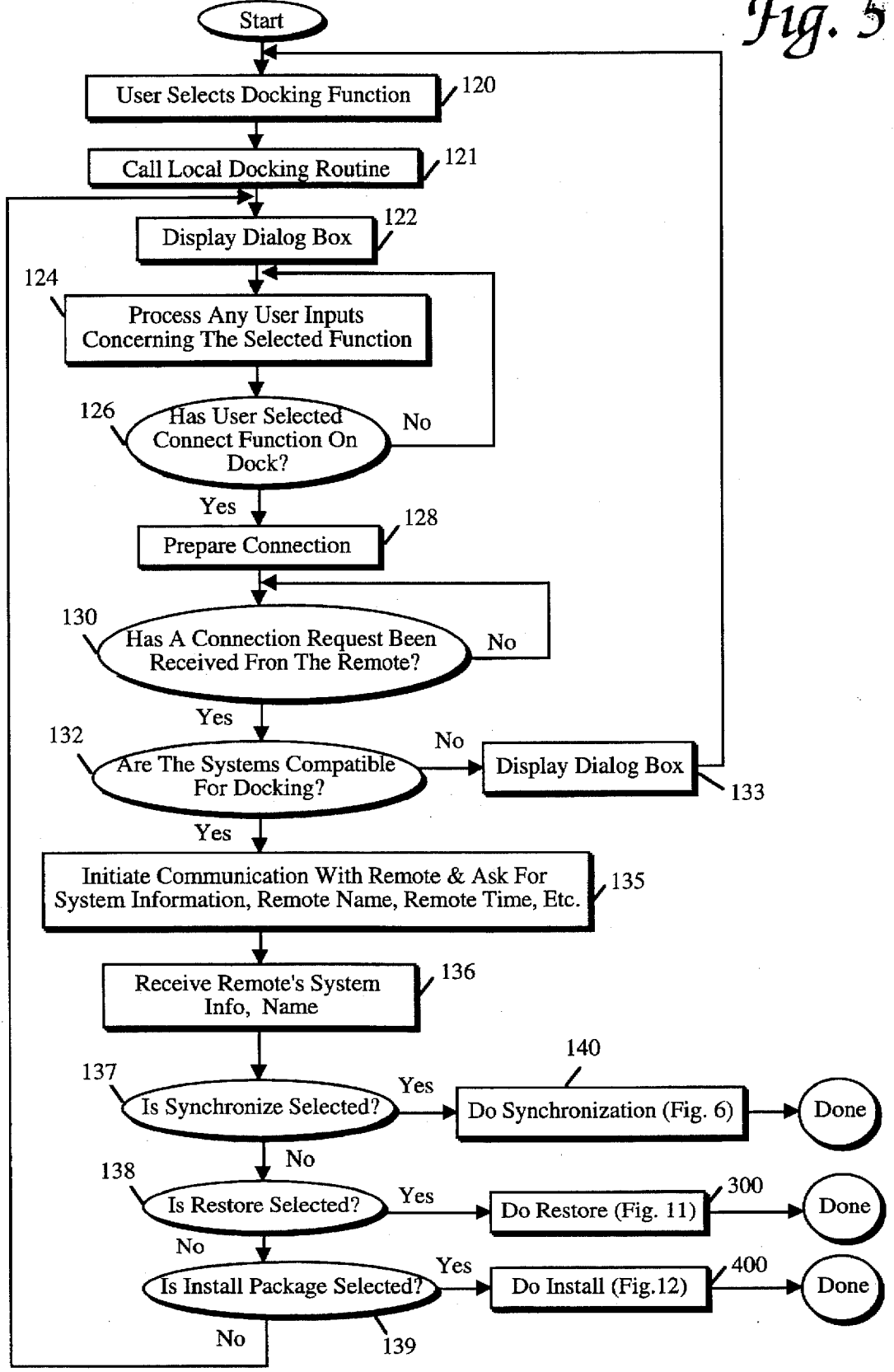
FIG. 5 is a flow diagram illustrating a method suitable for initiating and executing the docking function from the local side.

Referring next to FIG. 5, the connection process as seen by the dock (local computer system) will be described. Initially, in step 120, the docking function is selected by the user. The selection may be accomplished in any suitable manner as discussed above with reference to selecting the remote's docking function. When the docking function is selected, the local docking routine is called in step 121 and executed as described below. The local docking routine may be stored in any suitable memory on the dock (local) computer system. After the docking routine has been selected, a dialog box is displayed in step 122. The dialog box permits the user to select the function to be performed during the docking operation. By way of example, in the described embodiment, three functions are possible. The first is to synchronize the data between the dock and the remote. The second is to restore information to the remote in the event that the memory has been inadvertently erased. The third is to install a new package (i.e. application or the like) onto the remote. After the desired function has been selected, the host will wait to receive a connection request from the remote. In step 124, the CPU in the dock computer system processes any user inputs concerning the selected function. Again, the dialog box may be arranged to default to a particular function such as the synchronize function. Then in step 126, the logic waits for a connection request to be made. This may be accomplished in any suitable manner, such as by having the user select a connect button (not shown). When a connection request is received, the local computer prepares to establish a connection in step 128. Then in step 130, the local computer determines whether a connection request has been received from the remote. If not, it waits for such a request. Of course, it is desirable to provide some mechanism which allows the user to exit at this point (or at any other point in the docking routine) by quitting the docking routine in a conventional manner for the particular computer system being used.

When communication between the dock and the host is initiated, the local logic first determines whether the systems are compatible in step 132. If not, a dialog box indicating that the systems are not compatible is displayed in step 133 and the docking function is terminated. This determination is made based on the information that is received from the remote in its original connection request. Specifically, in the original connection request, the remote transmits information indicative of the system protocal version. When this information is received, the dock checks to determine whether it is using the same protocal version as (i.e., is capable of synchronizing with) the selected system. Step 132. If so, the logic proceeds to step 135, where it requests, and step 136, where it receives, the remote name and system information.

The remote name is obtained so that the dock knows which remote it is working with. This permits the same dock to be used to synchronize a plurality of different remotes with each different remote being designated by a different name. The system information transmitted includes the RAM size, as well as the screen height and width. This information is particularly important when restoring information to the remote.

Once the remote's name, time and system information have been received in step 136, the logic proceeds to step 137 where it determines whether the synchronize function has been selected. If so, the logic proceeds to step 140 where the synchronization process is executed as will be described below with reference to FIGS. 6–10. If synchronize has not been selected, then the logic proceeds to step 138 where it determines whether the restore function has been selected. If so, the logic proceeds to step 300, where the restore process is executed as will be described in more detail below with respect to FIG. 11. If the restore function has not been selected, the logic proceeds to step 139 where it determines whether the install function has been selected. If so, the logic proceeds to step 400 where the restore process is executed as will be described in more detail below with respect to FIG. 12. If none of the synchronize, restore or install functions have been selected, then an error has occurred and the logic returns to step 122 where the dialog box 510 is redisplayed to permit the user to select a desired function.

Figure 6:
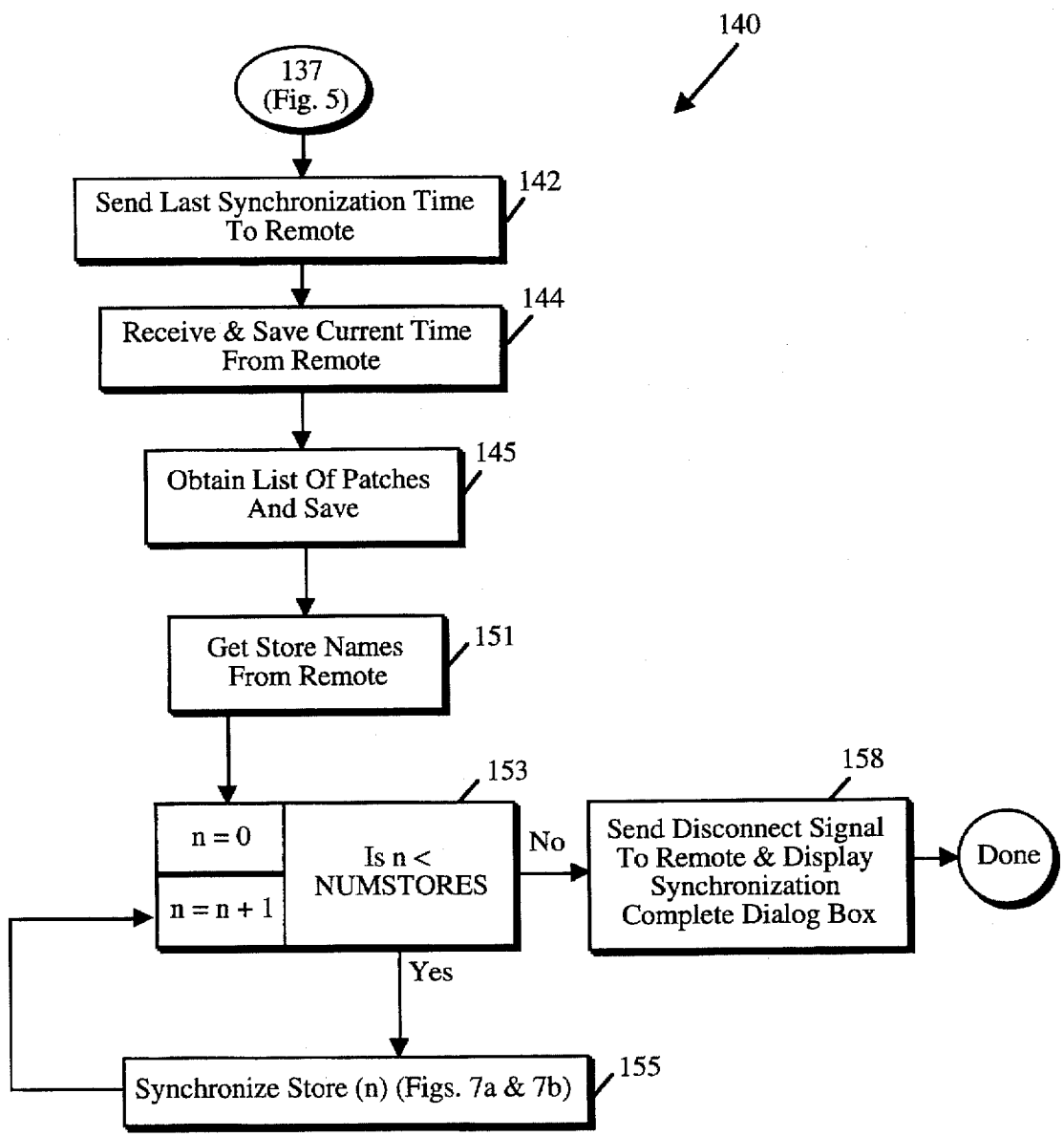
FIG. 6 is a flow diagram illustrating a method suitable for synchronizing a pair of computer systems in accordance with the present invention.

Referring next to FIG. 6, the synchronizing step 140 will be described in more detail. Initially in step 142, the dock sends a message to the remote which indicates the last time that the remote was synchronized by that particular dock. The time of the last synchronization is sent in order to determine which entries need to be updated. As indicated above, when an entry is revised, the revision time is entered as part of the data entry. This permits the synchronization to be time based. That is, only the records that have been added, deleted or revised since the last synchronization need to be revised. By maintaining a time-based backup system, multiple docks can be used to synchronize the information stored on a particular remote, which may be desirable for a variety of reasons.

After the dock has indicated the last time it was synchronized with the remote, the current remote time is requested and received by the dock. Step 144. All synchronization events are then performed on the basis of the remote's time, not the dock's time. The remote time is used as the clock for all synchronizing operations. Specifically, the synchronization is accomplished by looking primarily at records that were added or modified since the last synchronization. Therefore, it is important to ensure that a single clock is used. The remote's clock was chosen for simplicity. This is simpler since the creation and last editing times associated with the records stored in the remote are all stored on the basis of its clock, so by using the remote's clock, the remote is not required to factor in any time differences when determining which records have been modified or added since the last synchronization. The current remote time is also saved so that after the synchronization operation has been completed, it can be used as the time of the last synchronization. By using the remote's time, potential problems that could arise in the event that the remote and the dock are on different clocks can be eliminated. After the current remote time has been received in step 144, the dock requests and receives any system software patches that are installed on the remote in a step 145. In step 151, the dock requests the names of each of the stores found on the remote. After the store names have all been received from the remote, a loop is initiated in which each of the stores is synchronized. The loop is initiated in step 153 where a counter "n" is initialized to zero. Then, in step 155, Store (n) is synchronized. The actual synchronization process will be described in more detail below with reference to FIGS. 7–10. Once Store (n) has been synchronized, the logic returns to step 153 where the counter "n" is incremented by one and compared to a value NUMSTORES which is indicative of the total number of stores stored in the remote. If the value of counter "n" is greater than or equal to the total number of stores NUMSTORES, then the synchronization process is complete and the logic moves to step 158 where a disconnect signal is sent to the remote, and synchronization complete dialog boxes are displayed on both the remote and the dock. As long as the value of counter "n" is less than the value NUMSTORES, the loop formed by steps 153-155 will be repeated, thereby synchronizing each of the stores. It is noted that in many embodiments, only one store would be provided. If the system is set up so that only one store can be provided, steps 151-153 can be eliminated and only step 155 performed (which is to synchronize the only store).

Figure 7A:
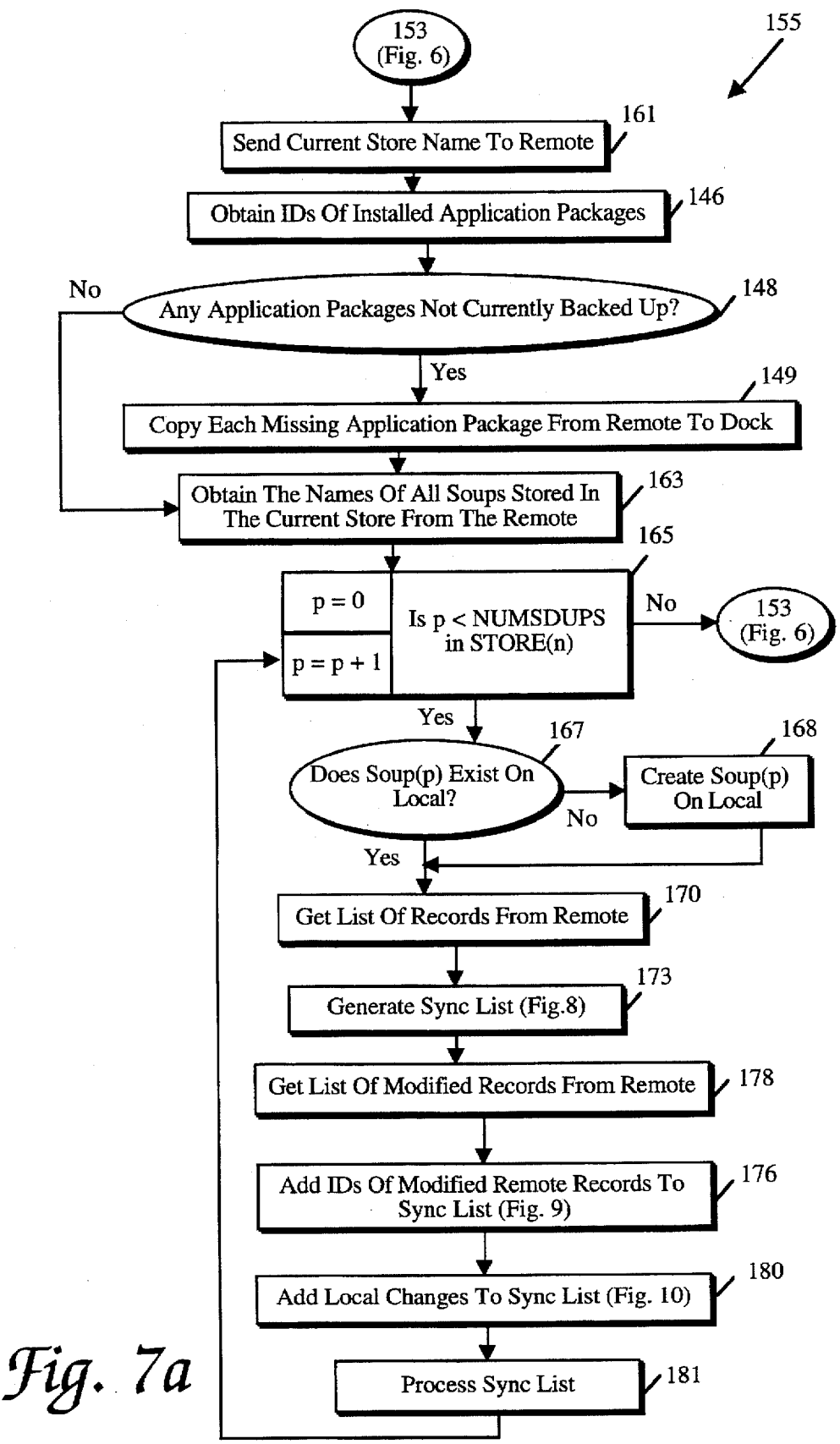
FIGS. 7(a) and 7(b) are flow diagrams that together illustrate in more detail the method for synchronizing a particular store in the computer system as set forth in FIG. 6.

Referring to FIG. 7a, the store synchronizing step 155 will be described in more detail. As seen therein, the name of the current store (i.e., store (n)) is sent to the remote in step 161. In step 148 the ID's of the packages on the dock are compared with the ID's of packages on the remote. If any packages are missing from the host, then in step 149, the missing packages are copied from the remote to the dock. Once all of the missing packages have been copied to the dock, the logic moves to step 163 where the dock requests and receives a list of soups that are located within the store. The list includes an indication of the total number of soups that exist within the store, NUMSOUPS. Thereafter, in steps 165-199, an extended loop is created for synchronizing each store. In essence, for each existing new record that is added to the soup on either the remote or the dock, a corresponding new entry is added to the other. Similarly, for each old record that has been edited since the last synchronization on either the remote or the dock, the corresponding record on the other is amended. In the event that a record has been amended on both the dock and the remote, a message is provided to the user informing them of the conflict. In the event that a record has been deleted on one of the computers, while its corresponding record has been amended on the other, the record is deleted in the described embodiment. On the other hand, it should be appreciated that in alternative embodiments, a conflict message could be provided in this instance as well.

The loop begins in step 165 where a counter "p" is initialized. It is then compared to the value NUMSOUPS, which is indicative of the number of soups contained within store (n). As long as the value of counter "p" is less than the value NUMSOUPS, the logic proceeds to step 167 where it determines whether Soup (p) exists on the dock. For the purposes of this description of the synchronization process, the dock will be referred to as the "local" computer. If Soup (p) does not exist on the local, then it is created in step 168. If Soup (p) did exist on the local in step 167 or after it is created in step 168 the logic proceeds to step 170 where it obtains a list of the records stored within Soup (p) on the remote. The list obtained includes an identification of each record that is currently stored in the soup.

The record identification list is then used to generate a sync list which will be used to synchronize the local and remote computers. The sync list is created in steps 173 to 180 and will be described in more detail below with reference to FIGS. 8-10. Initially, in step 173, the initial sync list is created which identifies all records that exist on only one of the two computer systems. If a record was added to the remote, a record indicator is set which indicates that the record should be added to the local. If a record was added to the local, a record indicator is set which indicates that the record should be added to the remote. If a record was deleted from the local, a record indicator is set that indicates it should be deleted from the remote. And finally, if a record was deleted from the remote, it is initially archived and then deleted from the local. The list of added and deleted records, with their corresponding record indicators set, then forms the preliminary sync list. This process will be described in more detail below with reference to FIG. 8.

After the sync list has been initially created, the local requests and receives in step 178 a list of records that have been edited on the remote since the last synchronization. In essence, a loop is performed on the remote which checks to determine which (if any) records in the current Soup were edited since the last synchronization. This is done by comparing the time of the last synchronization to the time of the last edit. If the last edit was more recent, then the associated record was edited since the last synchronization and the record is added to the modified records list. Thus, the modified records list is a compilation of all of the records that have been edited since the last synchronization.

After the modified records list has been received in step 178, the listed records are added to the sync list in step 180 as will be described in more detail below with respect to FIG. 10. All modified records are added to the sync list. After the completion of step 180, the sync list is mended by adding an indication of each record on the local computer that has been edited since the last synchronization. This process will be further described below with reference to FIG. 9. If any of the modified records have also been modified on the remote, then the user is informed of the inconsistent actions. If any of the modified records had been deleted on the remote, then those changes are ignored in the described embodiment. However, it should be appreciated that in alternative embodiments, the user could be informed of the inconsistent actions. All other modified records are added to the list.

Figure 7B:
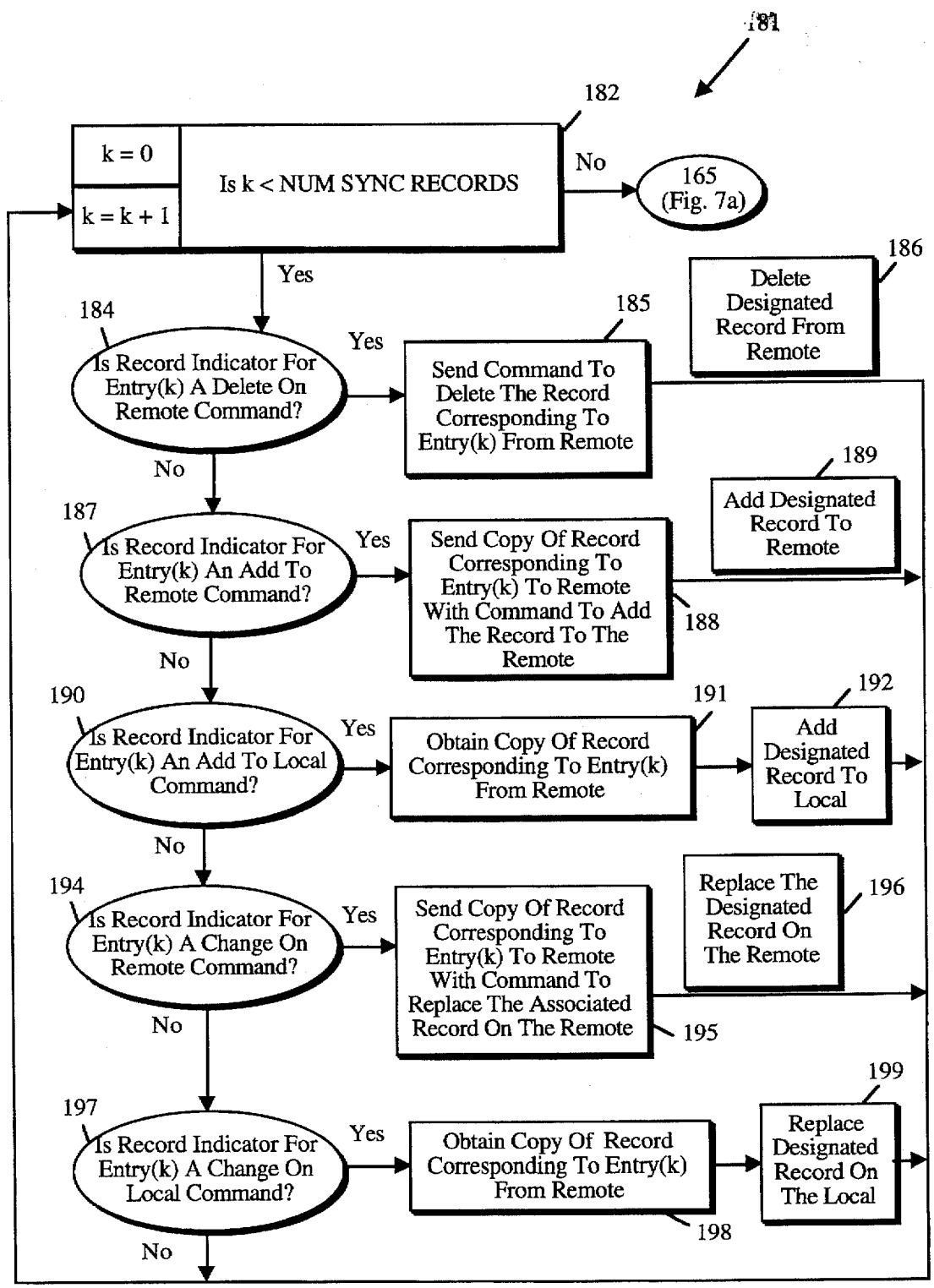

Initially, in step 182, a counter "k" is initialized to zero and compared to a value NUMSYNCH RECORDS which is indicative of the number of records that are listed in the sync list. Assuming that the value of counter "k" is less than the value NUMSYNCH RECORDS, the logic proceeds to step 184 where it determines whether the record indicator for entry (k) is a "delete on remote" command. If so, a command is sent to the remote to delete the record corresponding to entry (k) in the sync list. The logic then returns to step 182 where the counter "k" is incremented and again compared to the value NUMSYNCH RECORDS. As seen in FIG. 7(b), a step 186 is then simultaneously performed on the remote. In step 186, the actual delete operation is conducted.

If in step 184 the record indicator for entry (k) is not a "delete on remote" command, then the logic proceeds to step 187. In step 187, the logic determines whether the record indicator for entry (k) is set to an "add to remote" command. If so, the logic proceeds to step 188 where it sends a copy of the record corresponding to entry (k) to the remote along with a command to add this record to the remote. The remote returns the new record number and the record on the local is assigned that number. This number is returned as a response to the command to add the entry. The logic then returns to step 182 where the counter "k" is incremented as discussed above. Simultaneously, the designated record is added by the remote in step 189.

If in step 187 the record indicator for entry (k) is not an "add to remote" command, then the logic proceeds to step 190. In step 190, the logic determines whether the record indicator for entry (k) is set to an "add to local" command. If so, the logic proceeds to step 191 where it requests and receives a copy of the record corresponding to entry (k) from the remote. The logic then proceeds to step 192 where the received record is added as a new record on the local. After the record has been added, the logic proceeds to step 182 where the counter "k" is incremented as discussed above.

If in step 190 the record indicator for entry (k) is not an "add to local" command, then the logic proceeds to step 194. In step 194, the logic determines whether the record indicator for entry (k) is set to a "change on remote" command. If so, the logic proceeds to step 195 where it sends a copy of the record corresponding to entry (k) to the remote along with a command to replace the corresponding record on the remote. The logic then returns to step 182 where the counter "k" is incremented as discussed above. Simultaneously, the designated record is replaced by the remote in step 196.

If in step 194, the record indicator for entry (k) is not a "change on remote" command, then the logic proceeds to step 197. In step 197, the logic determines whether the record indicator for entry (k) is set to a "change on local" command. If so, the logic proceeds to step 198 where it requests and receives a copy of the record corresponding to entry (k) from the remote. The logic then proceeds to step 199 where the received record replaces the existing corresponding record on the local. After the record has been replaced, the logic proceeds to step 182 where the counter "k" is incremented as discussed above. Similarly, if for any reason in step 197, the record indicator for entry (k) is not a "change on remote" command, then an error has presumably occurred and the logic returns to step 182 where the counter "k" is incremented. If desired, an error message can be displayed at this point. However, such an arrangement is not used in the described embodiment.

Referring next to FIG. 8, the step 173 of generating the sync list will be described in more detail. As seen therein, counters "i" and "j" are initially set to zero in step 205. In step 207, two variables are used. Initially, the variable REMOTE COUNT is used to denote the number of records found in the current soup in the remote. Similarly, the variable LOCAL COUNT is used to denote the number of records found in the current soup in the local. In step 207, the value of counter "i" is compared to the value REMOTE COUNT, and the value of counter "j" is compared to the value LOCAL COUNT. If either of the counters are less than their corresponding variables, then the logic proceeds to step 209. On the other hand, if both of the counters are greater than or equal to their corresponding variables, then the initial sync list has been completed and the logic proceeds to step 176 as described earlier with reference to FIG. 7(a).

In step 209, the logic determines whether the value of counter "i" is greater than or equal to REMOTE COUNT. If so, there are no more records in the remote soup to compare against. In this case, the logic proceeds to step 211 where a variable REMOTE IDENT is set to "NONE" since no record exists on the remote for the current value of counter "i". When the value of counter "i" is less than the value of REMOTE COUNT in step 209, the logic proceeds to step 213, where the variable REMOTE IDENT is set equal to the identification characteristics of record "i" in the current soup of the remote (designated REMOTE ID(i)). Thus:

REMOTE IDENT=REMOTE ID(i)

The information included in the variable REMOTE IDENT typically includes the record number on the remote. The logic then moves to step 215, where it determines whether the value of REMOTE IDENT is greater than or equal to the value of variable LOCAL MAX. LOCAL MAX is the record number of the next record from the remote that could be added to the local. For example, if the last time a sync occurred the local received record number 10 from the remote, LOCAL MAX could be 10. After the sync, if another record were added to the remote, it would be given record number 11. This allows the local to determine all records added to the remote since the last sync. If the value of REMOTE IDENT is less than LOCAL MAX, the logic proceeds to step 231 as will be described further below. However, if the value of REMOTE IDENT is greater than or equal to the value of LOCAL MAX, then all additional records on the remote have been added since the last synchronization. This result is inherent since, as described above, the record numbers are provided in sequential chronological order and deleted record numbers are not reused. In this event, all additional records on the remote must be added to the local. Thus, an indication is made in the record indicator for each new remote record to be added to the local. Specifically, in step 217, the value "i" is compared to the value REMOTE COUNT. As long as the value of counter "i" is less than the value of variable REMOTE COUNT, the logic proceeds to step 219, where a new record indicator is added to the sync list that corresponds to REMOTE ID(i) (i.e., the identification for record (i) in the current soup of the remote). The new record indicator is set to an "add to local" command. After the record indicator has been set, the counter "i" is incremented in step 221 and the logic returns to step 217 to determine whether the value of counter "i" is still less than the value of variable REMOTE COUNT. As long as there are additional new records in the remote, the new records will be added to the sync list by the loop 217-221. When all of the new records have been added, the value of counter "i" is equal to the value of REMOTE COUNT and the logic returns to step 207.

After the value REMOTE IDENT has been set to "NONE" in step 211 or when the value of counter "i" is not determined to be larger than the highest remote ID number stored in the local in step 215, then the logic proceeds to step 231 where it is determined whether the value of counter "j" is greater than or equal to the value of the LOCAL COUNT. This effectively determines whether there are any more records in the current soup to compare against. If not, the logic moves to step 233 where the variable LOCAL IDENT is set to "NONE." A "NONE" label implies that the local does not have a record corresponding to counter value "i." Thereafter, the logic moves to step 245.

If the value of the counter "j" is less than the value of LOCAL COUNT, then the logic moves to step 235 where the variable LOCAL IDENT is set equal to the identification characteristics of record "i" in the current soup of the local (designated LOCAL ID(i)). The information typically includes the same information as discussed above with respect to variable REMOTE IDENT, i.e. typically just the record number. Then in step 237 the logic determines whether the variable LOCAL IDENT identifies a new record that has been added to the local computer system. As indicated above, new records added to the local computer system are identified with a special marker so the logic only needs to check to determine whether the special marker is set. If the record identified by LOCAL IDENT is not a new local record, then the logic proceeds to step 245.

If the record identified by LOCAL IDENT is a new record, then, in step 239, an addition is made to the sync list corresponding to record LOCAL ID(j) with the new record indicator being set to an "add to remote" command. After the record indicator has been set, the counter "j" is incremented in step 241 and the logic returns to step 207.

After the value LOCAL IDENT has been set to "NONE" in step 233 or it is determined that LOCAL IDENT does not identify a new record that has been added to the local in step 237, then the logic passes to step 245 where a check is made to determine whether the value REMOTE IDENT is equal to the value LOCAL IDENT. If so, the record has not been either newly added or deleted to either computer system and the counters "i" and "j" are each incremented and the logic returns to step 207 to repeat the described process. The equality may exist because the record is not found in either the local or the remote, or because it is found in both.

If the values for REMOTE IDENT and LOCAL IDENT are not equal in step 245, then in step 244 it is determined whether the value of REMOTE IDENT is equal to NONE. If so, the record has been deleted on the remote. In this case, the corresponding local record is first archived in step 263. This is accomplished by saving the record to the archive memory. Thereafter, in step 265, the record identified by LOCAL IDENT is deleted. Together, these sets serve to archive and delete the record that had been deleted on the remote. After the deletion, the counter "i" is incremented and the logic returns to step 207 where the entire described process is repeated until both the value of counter "i" equals or exceeds REMOTE MAX and the value of counter "j" equals or exceeds LOCAL MAX. In this manner, the preliminary sync list is formed. If REMOTE IDENT is not equal to NONE, the logic moves to step 261. If Local Ident is equal to NONE or Local Ident is greater than Remote Ident, the record has been deleted on the local. Accordingly, in step 251, another item is added to the sync list which corresponds to remote record REMOTE ID(i) and a "delete on remote" command is entered in the entry in step 251. Thereafter, the value "j" is incremented by one in step 253 and the logic returns to step 207 where the entire process is repeated.

Figure 9:
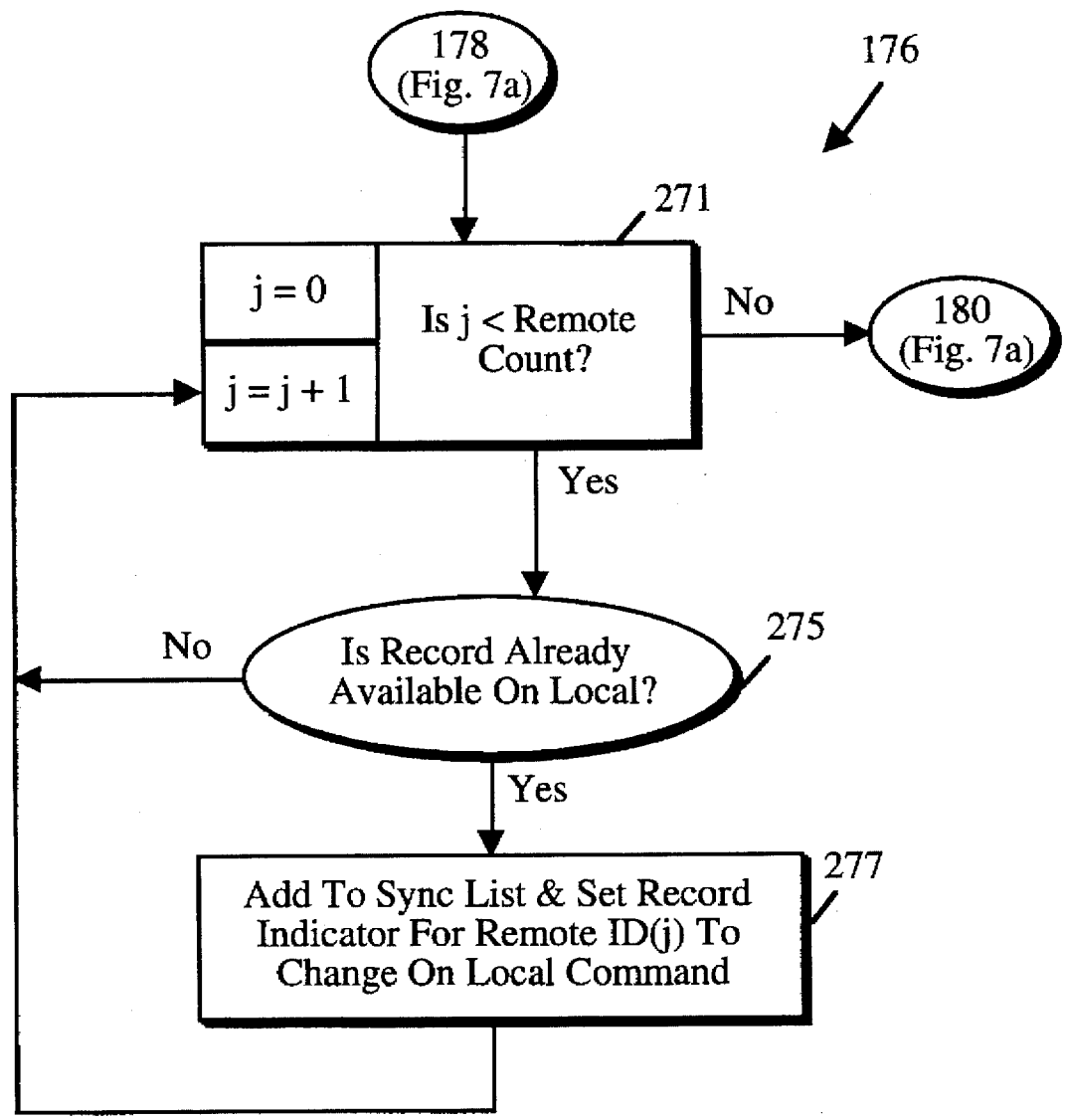
FIG. 9 is a flow diagram illustrating the method of adding local changes to the sync list as set forth in FIG. 7(a) in more detail.

Referring next to FIG. 9, the step 176 of adding remote changes to the sync list will be described. As indicated in step 178, a list is made of all of the records that have been edited in the remote and the list is transmitted to the local. It is this list that will be worked with in step 271. Initially, in step 271, a loop is established which covers each of the records changed in the remote computer system. The loop begins by initializing a counter "j" to zero and checking to determine whether the value of "j" is less than the number of records changed in the remote computer system. If not, the remote change adding step is complete and the process moves on to step 178 as described above with reference to FIG. 7(a). If so, the logic moves to step 275 where it is determined whether the record already exists on the local. If not, the record will be added as a result of the step described with reference to FIG. 8. In this event, the logic returns to step 271 where the counter "j" is incremented and the described process is repeated.

When the record is already on the local when checked in step 275, the logic proceeds to step 277 where an entry is made to the sync list that corresponds to REMOTE ID(j), with its record indicator being set to a "change on local" command. Thereafter, the logic returns to step 271 as previously described.

Figure 10:
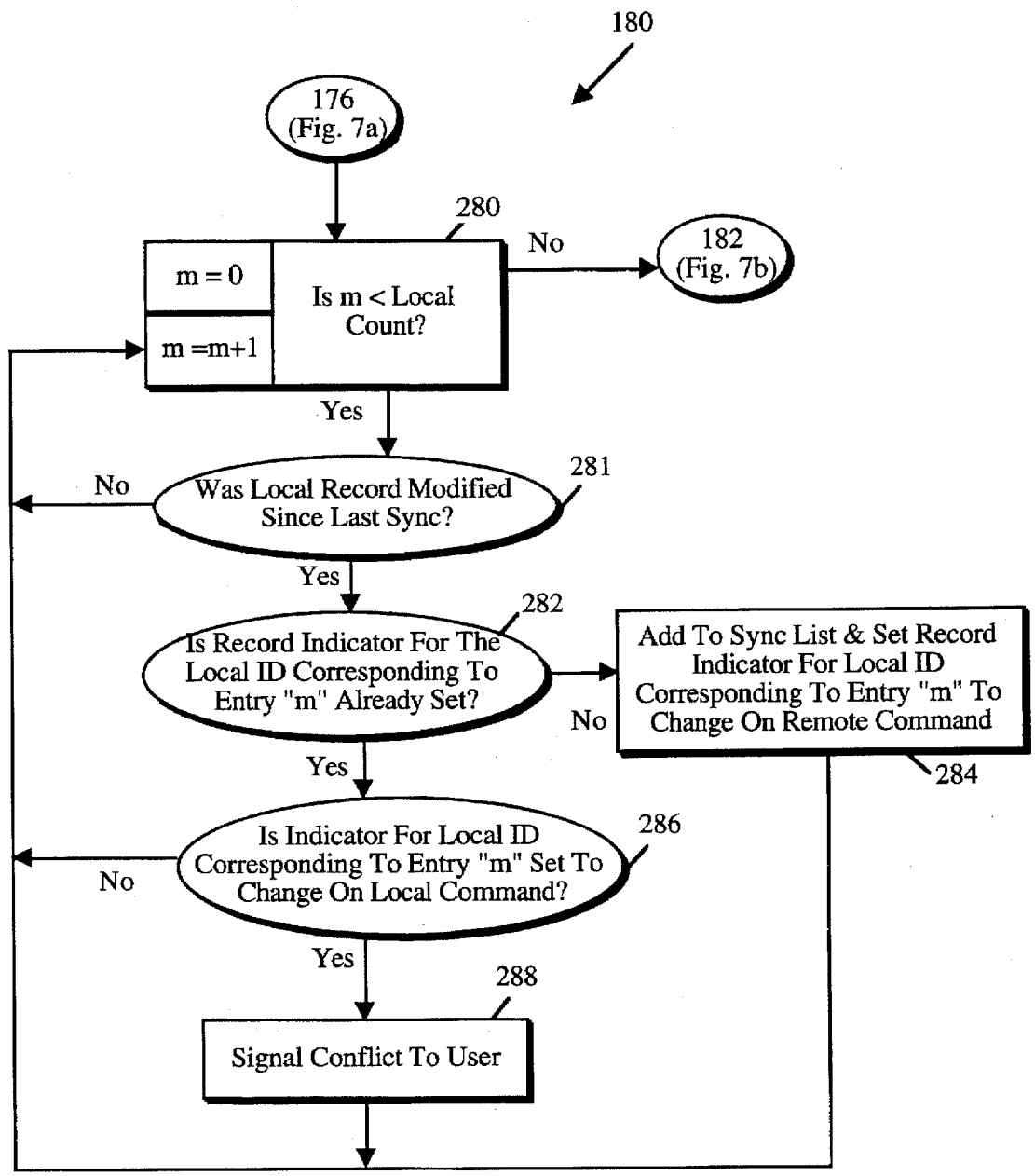
FIG. 10 is a flow diagram illustrating the method of adding remote changes to the sync list as set forth in FIG. 7(a) in more detail.

Referring next to FIG. 10, the process 180 of adding the IDs of records that have been edited on the local will be described in more detail. Initially, in step 280, a loop is initiated that will step through each of the entries in the local records list. Then, in step 281, it checks to determine whether local record "m" was modified since the last synchronization. If not, the logic returns to step 280 where the counter "m" is incremented and the incremented value is again compared to the count of records on the local computer system. Then, in step 282, the logic checks to determine whether the record indicator for the local ID corresponding to entry "m" in the sync list is already set. If not, the logic proceeds to step 284 where an addition is made to the sync list that corresponds to the LOCAL ID that is associated with entry "m." The associated record indicator is also set to a "change on remote" command. Thereafter, the logic returns to step 280 where the counter "m" is incremented and compared to the number of entries in the local. If the value of "m" is less than the local count, the described loop continues. On the other hand, if the value of "m" is not less than the local count, the modified records have all been added to the sync list which is now completed. At that point, the logic proceeds to step 182 where the actual synchronization begins.

If in step 282 the record indicator for the LOCAL ID corresponding to entry "m" is already set, the logic proceeds to step 286 where it checks to determine whether the record indicator is set to a "change on local" command. If so the corresponding record has been modified in both the local and remote. In the described embodiment, neither has priority and thus, in step 288, a dialog box is displayed that indicates a conflict and the user is permitted to choose the desired version (or to keep copies of both). If the record indicator is not set to a "change on local" command, then it must be set to a delete command or an "add to remote" command. If it is an "add to remote" command, the record was both added and changed on the local since the last sync. In this case, since the record is already going to be added to the remote, the change can be ignored. If it is a delete command, the delete command will have priority. However, as always, in alternative embodiments, the user could be informed of the conflict. If the result of step 286 is negative (i.e., a delete or add command was indicated in the record indicator), or after the user has been notified in step 288, the logic returns to step 280 where the counter "m" is incremented as described above. The described process is then repeated over and over until all of the entries in the local computer system have been processed.

Figure 11:
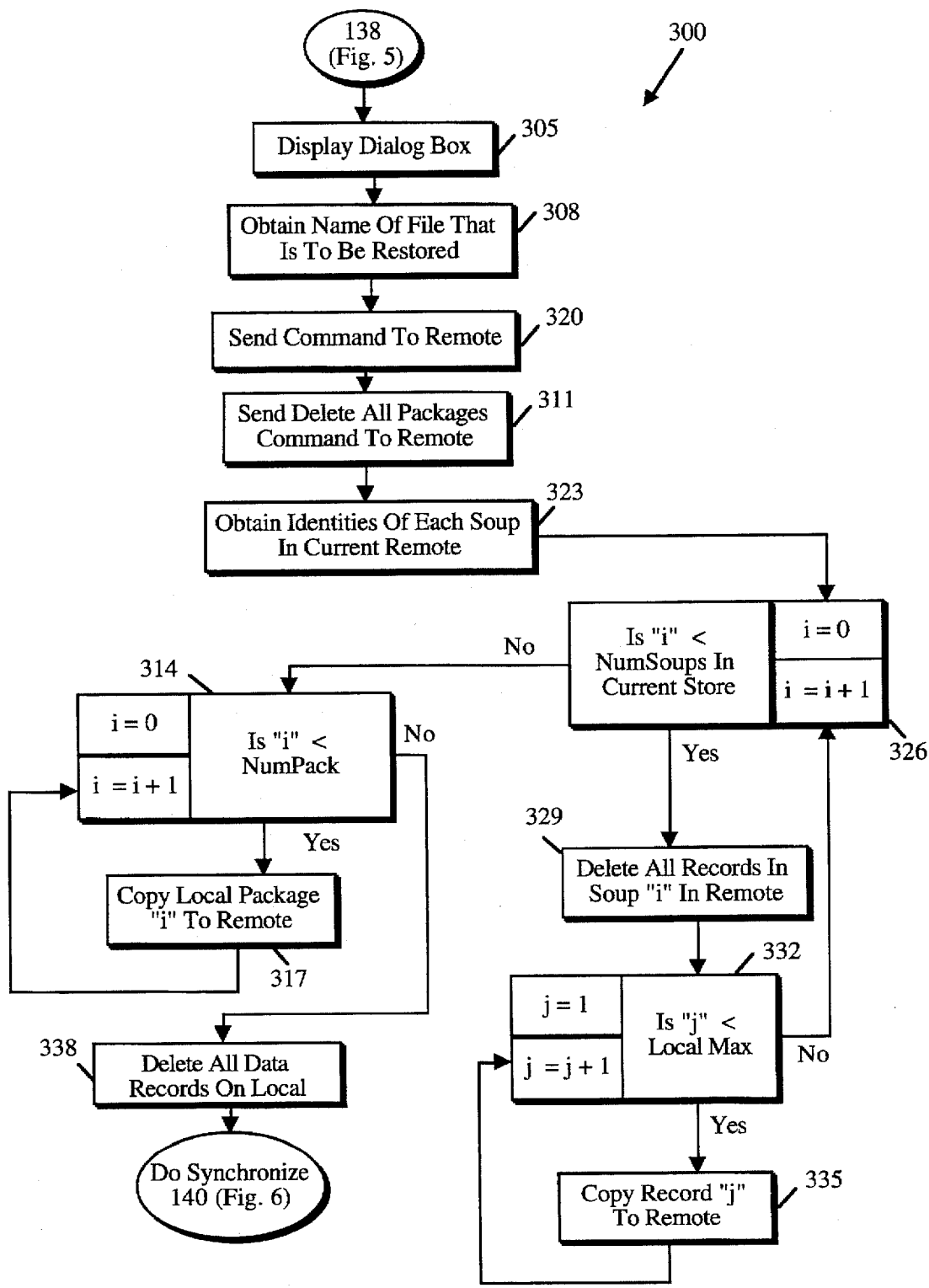
FIG. 11 is a flow diagram illustrating a method of restoring information to the remote computer system.

Referring next to FIG. 11, a suitable process (step 300) for restoring data to the remote will be described. As seen therein, a dialog box is initially displayed in step 305 which asks the user which file is to be restored. In the described embodiment, the dialog box (not shown) indicates each file that the local computer system is capable of restoring and the user may select any one of these. In step 308, the name of the user input is obtained which indicates the name of the file that is to be restored. Thereafter, in step 320, a command is sent to the remote to set the current store to the store being restored. This could be the remote's internal store or an auxiliary store. Thereafter, in step 311, a command is sent to the remote to delete all packages on the remote. This insures that duplicate packages will not be created on the remote during the subsequent restore operation.

Once the old packages have been deleted, the logic moves to step 323 where it obtains the identifies of each soup that is found within the current remote store. Thereafter, a loop is created in steps 326–335 which restores each of the records in each soup of the current store. In essence, step 326 establishes a loop that sequentially steps through each soup in the store. A counter "i" is initialized and then compared with a variable (NUMSOUPS) that indicates the number of soups found within the current store. As long as the value of counter "i" is less than the variable NUMSOUPS, there are additional soups to be copied.

The next step 329 is to delete all of the records (if any) in soup "i" that are still stored in the remote. Then in steps 332 and 335, a loop is formed which copies each record stored in the local to the remote. This causes the record numbers to change in the remote, and a sync is subsequently performed, as will be discussed later. After all of the records in the soup "i" have been copied, the logic returns to step 326, where the counter "i" is incremented. The described process is then repeated for each soup until all of the soups have been copied. After the last soup has been copied, the restoration process continues with the existing packages on the local being transferred to the remote. The restoration of the packages is accomplished by way of a loop created by steps 314 and 317. In step 314, a loop is created, and a counter "i" is initialized. Then in step 317, package (i) is copied from the local to the remote. The logic then returns to step 314 where the counter "i" is incremented and this process continues until all of the packages have been copied. After the last package has been copied, all of the data records on the local are deleted in step 338 and the two systems are synchronized in step 140. The synchronization step 140 proceeds exactly as described above with reference to FIGS. 6–10. The local record deleting step 338 and the synchronization step 140 are provided to insure that the record numbers in the local are identical to the record numbers in the remote.

Figure 12:
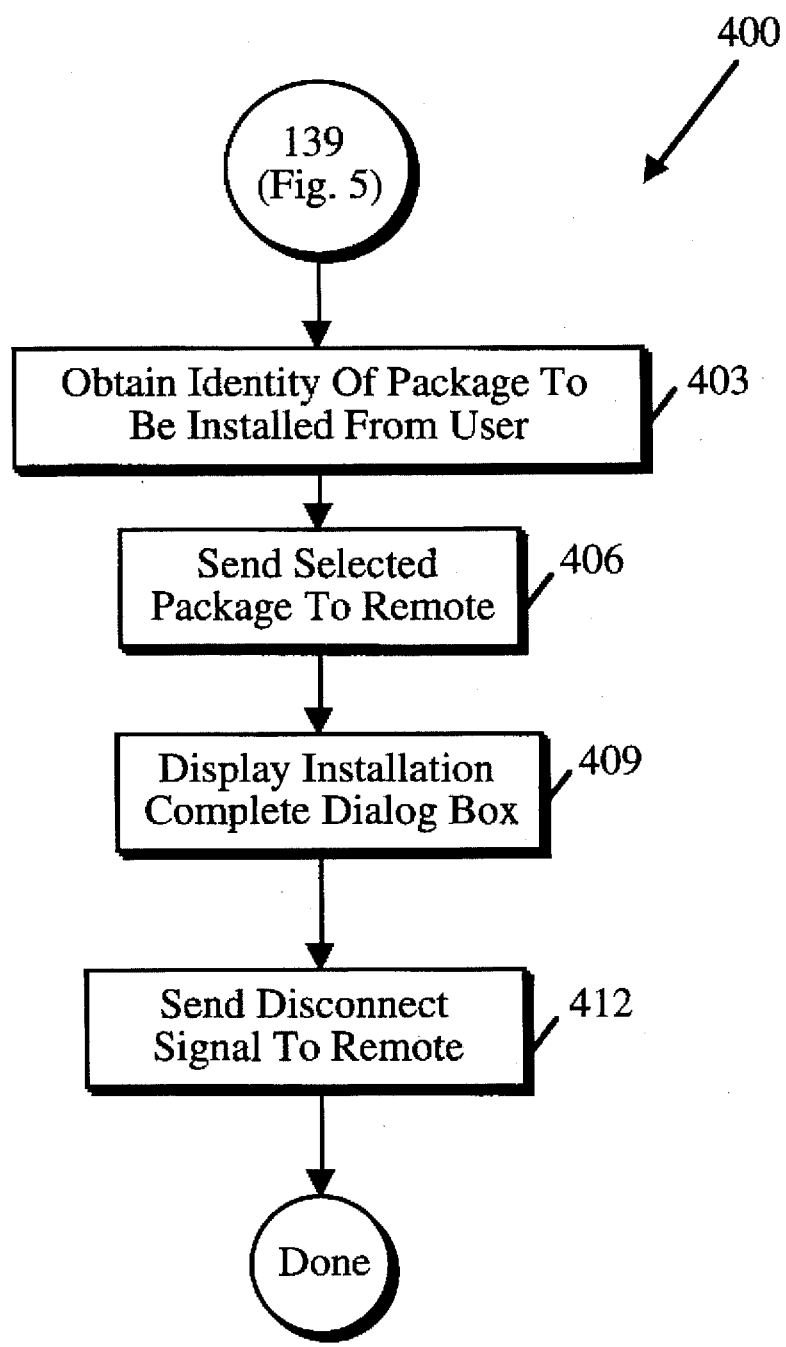
FIG. 12 is a flow diagram illustrating a method of installing a new package to the remote computer system.

Referring next to FIG. 12, the package-installing step 400 set forth above in the discussion of FIG. 5 will be described in more detail. Initially, in step 403, the identity of the package to be installed is obtained by the user. This is accomplished by first displaying a dialog box asking the user which package(s) is/are to be installed. The user then selects the desired package. After the desired package has been selected, it is sent to the remote and copied thereon. After the selected package has been copied, a dialog box is displayed in step 409 which indicates that the installation has been completed. After the dialog box has been displayed, a disconnect signal is sent to the remote in step 412. At this point, the installation is complete.

Although only one embodiment of the present invention with some variations has been described in detail herein, it should be understood that the present invention may be embodied in many other specific forms without departing from the spirit or scope of the invention. For example, the computer systems upon which the described synchronization, backup and restoring tasks are executed may be varied widely. Although the invention has been described in reference to a portable computing device (such as a hand-held computer system) being synchronized with a more fixed computing system such as a desktop computer, it should be appreciated that the invention can be applied to the synchronization of virtually any computing systems. By way of example, it can be used to synchronize two portable devices, two desktop devices, a terminal and a host computer, etc.

Although one specific method of implementing the invention has been described, the actual algorithms by which the invention is carried out may also be widely varied within the scope of the claims. Further, the restore and install functions need not be included with the synchronization package as described. The user inputs may be entered via keyboard entries, soft buttons on the screen, menu items, voice entry or any other input mechanism. Additionally, the contents, structure and/or formats of the stored application files and records, as well as the nature of the display formats, may all be varied widely. From the foregoing, it should be apparent that the present examples are to be considered as illustrative and not restrictive, and the invention is not to be limited to the details given herein, but may be modified within the scope of the appended claims.

We claim:

1. A method for synchronizing data records stored in a first computer system with corresponding data records stored in a second computer system, each computer system having memory capable of storing a multiplicity of selected records that are intended to be synchronized, the method comprising the steps of:

identifying each record stored in the memory of the first computer system that is intended to be synchronized with a unique identification indicia and an indicia that indicates a time when the record was last altered;

initiating communication between the first computer system and the second computer system;

identifying to the second computer system a name indicator of the first computer system that is intended to be synchronized;

determining the last time that the records of the first computer system were synchronized with the second computer system in accordance with the name indicator of the first computer system;

identifying each of the selected records that was deleted on the first computer system since last synchronized with the second computer system and for each such deleted record on the first computer system, deleting the corresponding record from the second computer system;

identifying each of the selected records that was added to the first computer system since last synchronized with the second computer system and for each record that was added to the first computer system, copying such new record to the second computer system to create a corresponding record in the second computer system;

identifying each of the selected records in the first computer system that both has a corresponding record in the second computer system and was modified on the first computer system since last synchronized; and synchronizing the modified records between the first and second computer system;

wherein said record deleting step, said record adding step and said modified record synchronizing step cooperate to synchronize the records stored in the first computer system with records stored in the second computer system, wherein the second computer system is capable of synchronizing with a plurality of different first computer systems that may each have different data, and wherein said identifying of the first computer system that is intended to be synchronized is selected from the plurality of different first computer systems based on the name indicators for each of the plurality of different first computer systems, each of the name indicators being a unique indicia.

2. A method as recited in claim 1 further comprising the step of:

identifying each of the selected records that was added to the second computer system since last synchronized and adding such selected new records to the first computer system; and giving a unique identifying identification indicia to each said selected new record during the synchronization process to insure that duplicate identification indicia are not given to separate records which originate in the first and second computer systems, respectively.

3. A method as recited in claim 1 wherein the modified record synchronizing step includes the substeps of:

for each particular modified record in the first computer system, checking to determine whether an associated corresponding record in the second computer system has been modified; and wherein when the associated corresponding record has not been modified, the associated corresponding record is replaced by a copy of the particular modified record in the first computer system.

4. A method as recited in claim 3 wherein in the modified record synchronizing step, when the corresponding record associated with a particular modified record in the first computer system has also been modified in the second computer system, a dialog box is displayed on one of the computer systems asking the user to choose which modified version of the particular record should be retained.

5. A method as recited in claim 1 wherein during the synchronization process, the time of synchronization as determined by the first computer system is stored for future use as the time of last synchronization when the next synchronization between the first and second computer systems is performed.

6. A method as recited in claim 1 wherein the first computer system is capable of synchronizing its records with a plurality of different second computer systems and wherein a value indicative of the time of last synchronization is stored on each second computer system in order to identify the time of last synchronization with that particular second computer system.

7. A method as recited in claim 1 further comprising the step of archiving each corresponding record that is deleted from the second computer system.

8. A method as recited in claim 7 wherein the archived records are stored in the memory of the second computer system.

9. A method as recited in claim 1 wherein not all of the records that are stored in at least one of the first and second computer systems are intended to be synchronized.

10. A method as recited in claim 1 further comprising the step of archiving each record that is deleted from the second computer system during the synchronization process.

11. A method for synchronizing data records stored in a first computer system with corresponding data records stored in a second computer system, each computer system having memory capable of storing a multiplicity of selected records that are intended to be synchronized, the method comprising the steps of:

identifying each record stored in the memory of the first computer system that is intended to be synchronized with a unique identification indicia and an indicia that indicates a time when the record was last altered;

identifying each new record that has been added to the second computer system with a special identification indicia that will be changed when the new record is synchronized;

initiating communication between the first computer system and the second computer system;

identifying to the second computer system a name indicator of the first computer system that is intended to be synchronized;

determining the last time that the records of the first computer system were synchronized with the second computer system in accordance with the name indicator of the first computer system;

creating a synchronization list that identifies each of the selected records that was deleted on the first computer system since last synchronized with the second computer system but still exists on the second computer system, each of the selected records that was deleted on the second computer system since last synchronized with the second computer system but still exists on the first computer system, each of the selected records that was added to the first computer system, and each of the selected records that was added to the second computer system;

modifying the synchronization list; and using the modified synchronization list to synchronize the first and second computer systems, wherein records that have been deleted on one of the computer systems are generally deleted from the other and records that have been added to one of the computer systems are generally added to the other, wherein the second computer system is capable of synchronizing with a plurality of different first computer systems that have different name indicators and may each have different data, and wherein said identifying of the first computer system that is intended to be synchronized is selected from the plurality of different first computer systems based on the name indicators for each of the plurality of different first computer systems.

12. A method as recited in claim 11 wherein the synchronization modification step includes the substeps of adding entries corresponding to the selected records that have been modified on the first computer system to the synchronization list and adding entries corresponding to selected records that have been modified on the second computer system to the synchronization list.

13. A method as recited in claim 12, wherein the synchronization list contains at most one entry for each record.

14. A method as recited in claim 13, wherein when a record has been modified in one of the computer systems and its corresponding record has been deleted in the other, the modified record will be deleted.

15. A method as recited in claim 13, wherein when a record has been modified in both computer systems the user will be informed of the conflict.

16. A method as recited in claim 13, wherein when a record has been modified in one of the computer systems and its corresponding record has been deleted in the other, the user will be informed of the conflict.

17. A method as recited in claim 11 wherein during the synchronization step, any record that was initially added to the second computer system is assigned a new identification indicia by the first computer system when it is added to the first computer system.

18. A method as recited in claim 11 wherein the synchronization list is compiled on the second computer system.

19. A method as recited in claim 11 wherein during the synchronization process, the time of synchronization as determined by the first computer system is stored for future use as the time of last synchronization when the next synchronization between the first and second computer systems is performed.

20. A method as recited in claim 11 wherein the first computer system is capable of synchronizing its records with a plurality of different second computer systems and wherein a value indicative of the time of last synchronization is stored on each second computer system in order to identify the time of last synchronization with that particular second computer system.

* * * * *